(12) United States Patent
Young

(10) Patent No.: US 7,163,479 B2
(45) Date of Patent: Jan. 16, 2007

(54) SNAP-FIT CHAIN GUIDE WITH LOCKING CONNECTOR ARRANGEMENT

(75) Inventor: James D. Young, Chesaning, MI (US)

(73) Assignee: Cloyes Gear and Products, Inc., Mentor, OH (US)

( * ) Notice: Subject to any disclaimer, the term of this patent is extended or adjusted under 35 U.S.C. 154(b) by 0 days.

(21) Appl. No.: 10/860,873

(22) Filed: Jun. 4, 2004

(65) Prior Publication Data

US 2004/0220003 A1  Nov. 4, 2004

Related U.S. Application Data

(62) Division of application No. 09/992,470, filed on Nov. 16, 2001, now Pat. No. 6,758,777.

(60) Provisional application No. 60/249,691, filed on Nov. 17, 2000.

(51) Int. Cl.
*F16H 7/08* (2006.01)
*F16H 7/18* (2006.01)

(52) U.S. Cl. ........................ 474/140; 474/110

(58) Field of Classification Search ................ 474/101, 474/111, 140, 144, 145, 146
See application file for complete search history.

(56) References Cited

U.S. PATENT DOCUMENTS

| | | |
|---|---|---|
| 3,346,126 A | 10/1967 | Bloom et al. |
| 3,490,302 A | 1/1970 | Turner et al. |
| 4,826,468 A | 5/1989 | Friedrichs |
| 4,832,664 A | 5/1989 | Gröger et al. |
| 4,869,708 A | 9/1989 | Hoffmann et al. |
| 5,005,304 A | 4/1991 | Briscoe et al. |
| 5,045,032 A | 9/1991 | Suzuki et al. |
| 5,088,966 A | 2/1992 | Suzuki et al. |
| 5,184,982 A | 2/1993 | Shimaya et al. |
| 5,184,983 A | 2/1993 | Shimaya et al. |
| 5,193,244 A | 3/1993 | Meyers |
| 5,222,917 A | 6/1993 | Shimaya et al. |
| 5,318,482 A | 6/1994 | Sato et al. |
| 5,813,935 A | 9/1998 | Dembrosky et al. |
| 5,820,502 A | 10/1998 | Schulze |
| 5,984,815 A | 11/1999 | Baddaria |
| 6,013,000 A | 1/2000 | Moretz |
| 6,238,311 B1 | 5/2001 | Cutting |
| 6,322,470 B1 | 11/2001 | Markley et al. |
| 6,322,471 B1 | 11/2001 | Hashimoto |
| 6,620,067 B1 | 9/2003 | Nakamura et al. |

FOREIGN PATENT DOCUMENTS

| | | |
|---|---|---|
| DE | 1 848 350 | 3/1962 |
| DE | 24 31 425 | 1/1976 |
| DE | 76 05 901 | 8/1977 |

(Continued)

*Primary Examiner*—Marcus Charles
(74) *Attorney, Agent, or Firm*—Fay, Sharpe, Fagan, Minnich & McKee, LLP

(57) ABSTRACT

A chain guide, such as a fixed chain guide or a tensioner arm, includes a bracket adapted for being secured to an associated engine. The bracket includes a support surface, a leading end and a trailing end spaced from the leading end in a chain movement direction. A guide blade includes a leading end, a trailing end spaced from the leading end in the chain movement direction, a chain guide surface and an inner surface positioned adjacent the support surface of the bracket. The guide blade is selectively movable slidably on the support surface in the chain movement direction and an opposite direction between a first position where the blade is separable from the bracket and a second position where the blade is fixedly secured to the bracket.

7 Claims, 13 Drawing Sheets

FOREIGN PATENT DOCUMENTS

| | | |
|---|---|---|
| DE | 30 49 106 A1 | 7/1982 |
| DE | 197 28 675 A1 | 1/1998 |
| DE | 198 34 588 A1 | 2/2000 |
| DE | 100 10 335 A1 | 10/2000 |
| EP | 581219 A1 * | 2/1994 |
| FR | 2 276 514 | 1/1976 |
| JP | 2000097042 A | 4/2000 |
| JP | 2000257679 A | 9/2000 |

* cited by examiner

SNAP-FIT CHAIN GUIDE WITH LOCKING CONNECTOR ARRANGEMENT

CROSS-REFERENCE TO RELATED APPLICATION

This application is a divisional of U.S. application Ser. No. 09/992,470 filed Nov. 16, 2001, now U.S. Pat. No. 6,758,777 which claims benefit of the filing date of U.S. provisional application Ser. No. 60/249,691 filed Nov. 17, 2000, and both of said applications are hereby expressly incorporated by reference.

BACKGROUND OF THE INVENTION

The present invention relates generally to the automotive chain drive art and, more particularly, to a snap-fit chain guide with locking connector arrangement. In particular, the present invention relates to a novel and unobvious snap-fit chain guide blade that securely and slidably interconnects with a support bracket in a manner that is easy to install, durable and inexpensive.

Chain guides, which for purposes of this document include chain tensioner arms and fixed chain guides, are well known. In a typical arrangement, a blade made of a plastic or other low-friction material is fixedly secured to an underlying support bracket that is, itself, manufactured from metal or a filled plastic material. A wide variety of structures and methods are known for operatively interconnecting a plastic blade to an associated bracket.

One prior method of connecting a plastic blade to a support bracket requires use of an adhesive and/or mechanical fasteners. These methods increase assembly time and costs. Also, the plastic blade can separate from the bracket. In another known arrangement, the plastic blade is molded directly over the support structure of the bracket. This approach is also expensive.

Prior arrangements are known for releasably fitting a plastic blade to a bracket. One example is found in U.S. Pat. No. 5,820,502. In this patent, a plastic blade or lining B is secured to a carrier T with a pivoting snap-fit. However, the disclosed arrangement is limited to an I-beam type bracket or carrier T. Furthermore, the arrangement disclosed in the U.S. Pat. No. 5,820,502 patent is not a sliding snap-fit arrangement and, instead, requires that the plastic blade be pivoted or twisted into its operative position. As such, assembly is difficult and blade stress during assembly is increased. Secondly, the required pivoting action limits the different bracket configurations that can be employed, increases the space required for assembly and also increases the risk of improper and incomplete assembly.

In light of the foregoing, it has been deemed desirable to provide a snap-fit chain guide with locking connector arrangement that overcomes the foregoing specifically noted deficiencies and others while providing better overall results.

SUMMARY OF THE INVENTION

In accordance with the present invention, a chain guide, such as a fixed chain guide or a tensioner arm, includes a bracket adapted for being secured to an associated engine. The bracket includes a support surface, a leading end and a trailing end spaced from the leading end in a chain movement direction. A guide blade includes a leading end, a trailing end spaced from the leading end in the chain movement direction, a chain guide surface and an inner surface positioned adjacent the support surface of the bracket. The guide blade is selectively movable slidably on the support surface in the chain movement direction and an opposite direction between a first position where the blade is separable from the bracket and a second position where the blade is fixedly secured to the bracket.

One advantage of the present invention resides in the provision of a new and improved snap-fit chain guide with locking connector arrangement.

Another advantage of the present invention resides in the provision of a snap-fit chain guide having a locking connector arrangement wherein the blade is slidably rather than pivotably snap-fit into its operative position.

A further advantage of the present invention resides in the provision of a snap-fit chain guide that exhibits improved connection of the blade to the bracket and that is resistant to undesired movement in the chain travel direction and/or in a direction transverse to the chain travel direction.

Still another advantage of the present invention resides in the provision of a snap-fit chain guide that is snap-fit into position by moving the plastic blade in a direction that corresponds to the chain travel direction whereby chain movement cannot dislodge the blade from the bracket.

A further advantage of the present invention is found in the provision of a bracket that includes a support surface that abuts an inner surface of a plastic guide blade or shoe, wherein the support surface of the bracket is defined with a draft angle relative to a parting line and the inner surface of the plastic blade is defined with a corresponding reverse draft angle so that the blade, when loaded, is resistant to movement is a direction transverse to the chain travel direction. Furthermore, defining the inner surface of the plastic blade to have a reverse draft angle that mates with the draft angle of the bracket support surface eliminates a need to machine the support surface of the bracket as would be required if the inner surface of the plastic blade was defined without a reverse draft angle that intimately mates with the draft angle of the bracket support surface.

Other benefits and advantages of the present invention will become apparent to those of ordinary skill in the art to which the invention pertains upon reading this specification.

BRIEF DESCRIPTION OF THE DRAWINGS

The invention comprises various components and arrangements of components, preferred embodiments of which are illustrated herein and wherein:

FIGS. 8A-1–8A-3 are sectional views oriented along the line 8A–8A of FIG. 8 and showing the plastic blade in first, intermediate and final installation positions, respectively; and, FIGS. 8B-1–8B-3 correspond respectively to FIGS. 8A-1–8A-3, but are oriented along line 8B—8B of FIG. 8.

DETAILED DESCRIPTION OF PREFERRED EMBODIMENTS

Figure 1:
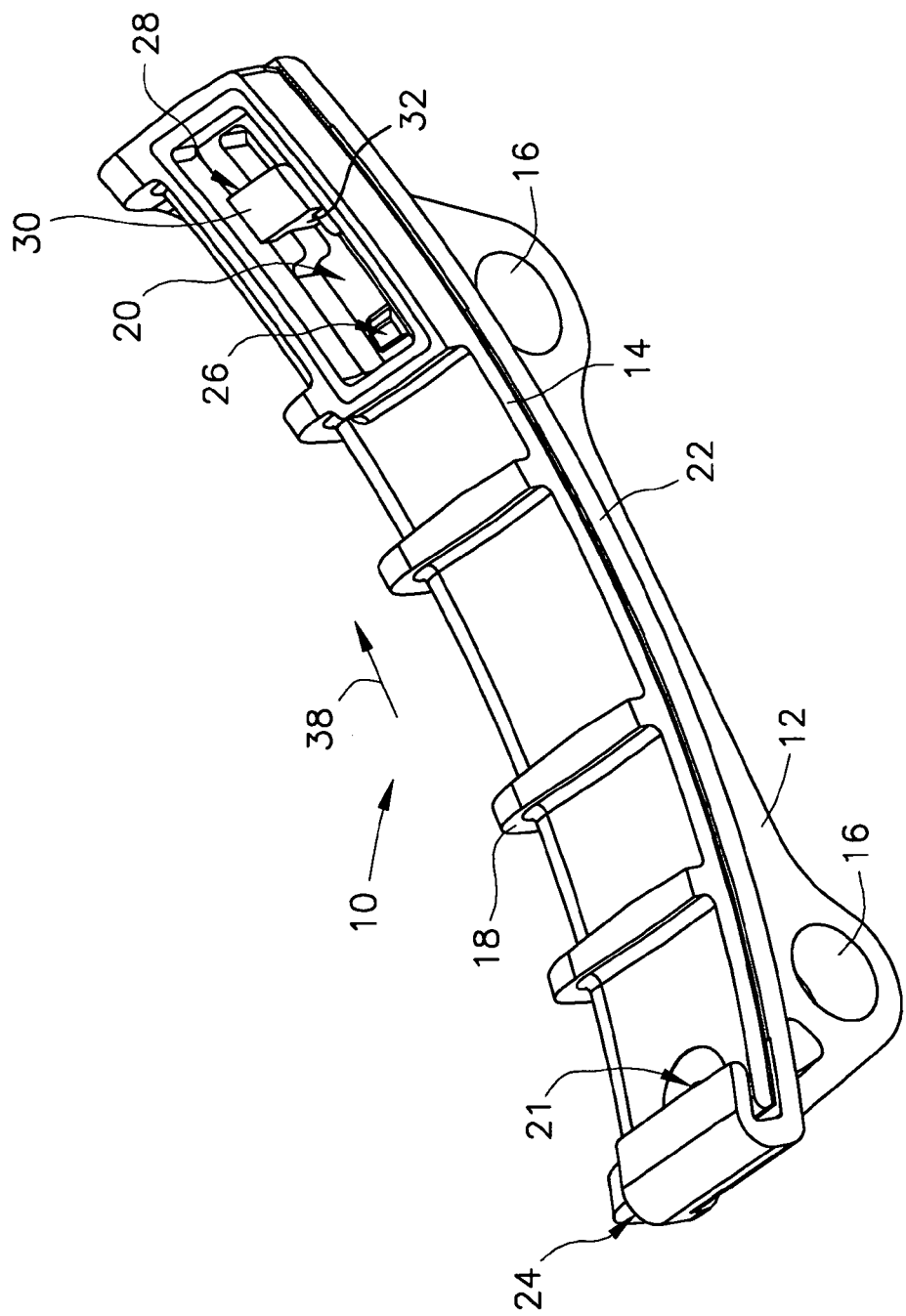
FIG. 1 is a isometric view of a snap-fit fixed-type chain guide formed in accordance with a first embodiment of the present invention.
Figure 2A:
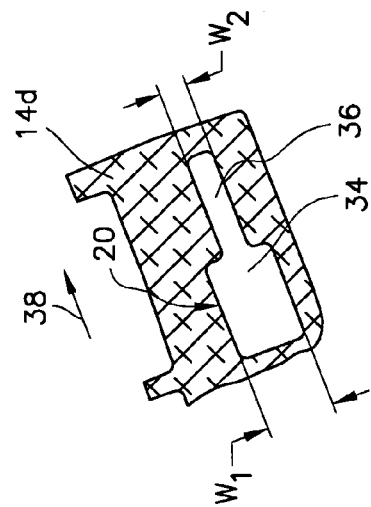
FIGS. 2A and 2B are sectional views taken along lines 2A—2A and 2B—2B of FIG. 2, respectively.
Figure 2B:
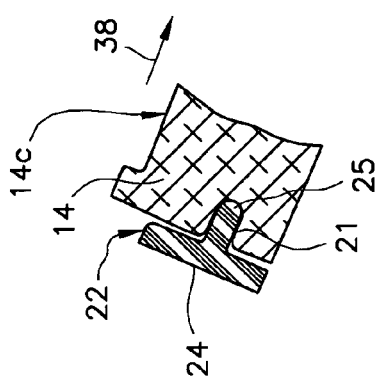
Figure 2:
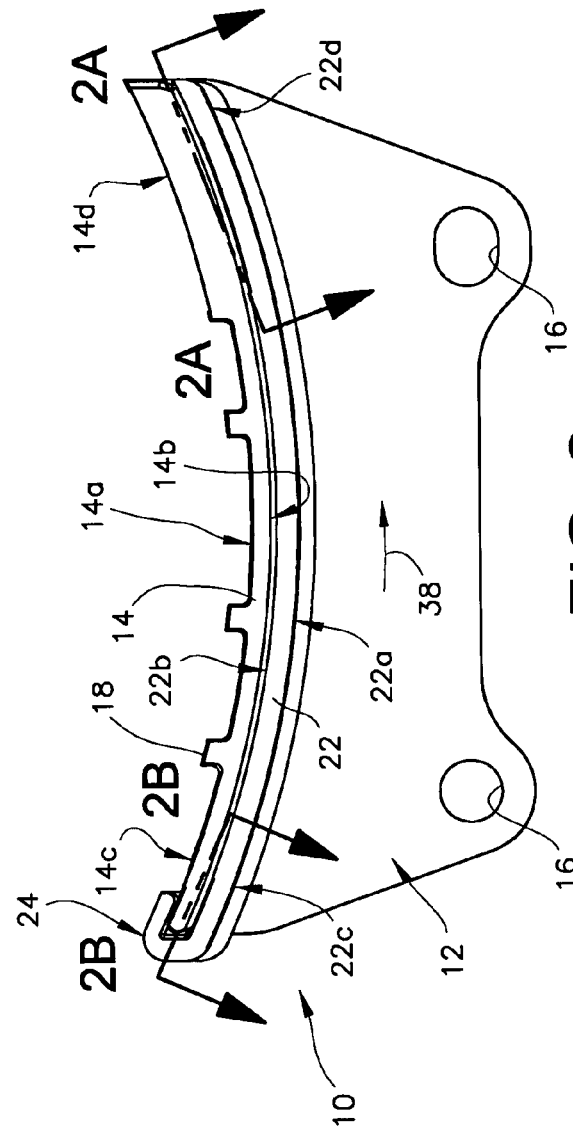
FIG. 2 is a front elevational view of the chain guide shown in FIG. 1.
Figure 3:
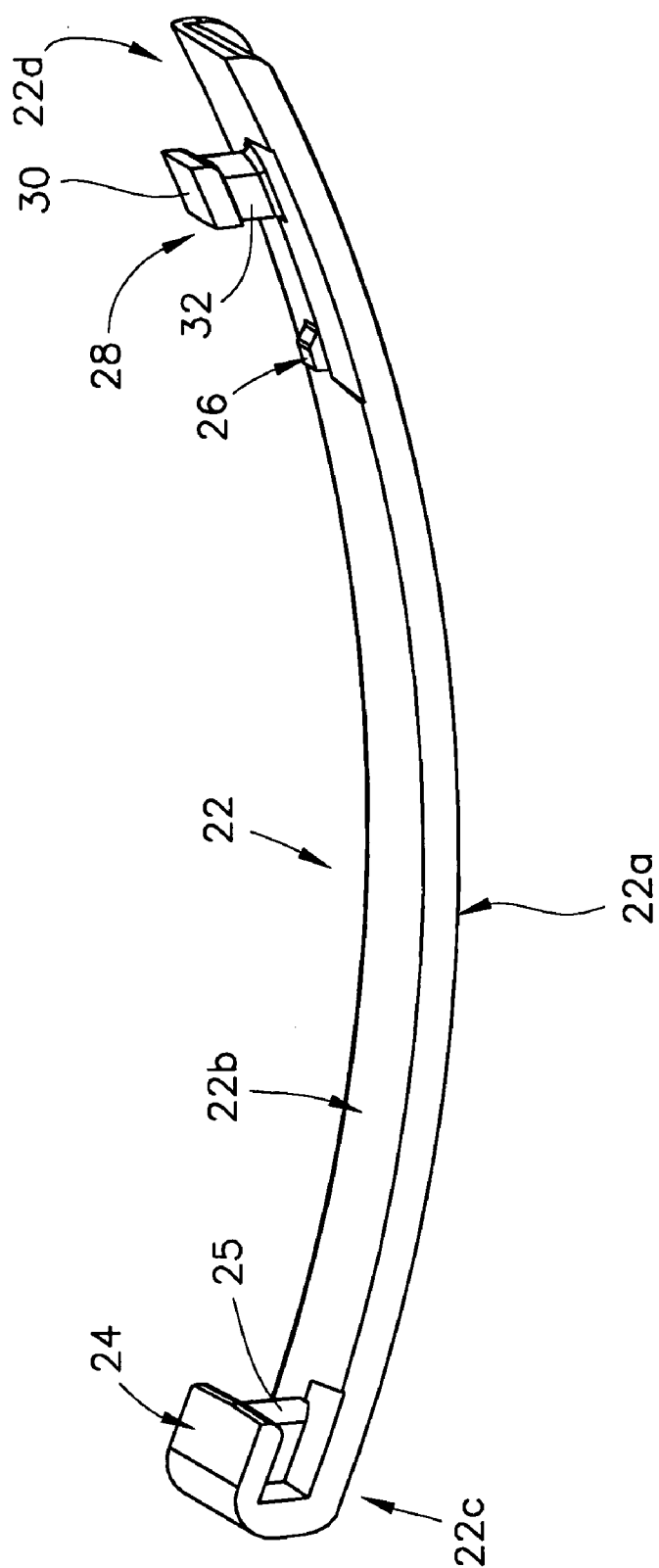
FIG. 3 is an isometric view of the plastic blade that forms a part of the snap-fit chain guide shown in FIG. 1.

With reference to FIGS. 1–3, a chain guide assembly 10 formed in accordance with the present invention includes an L-shaped bracket 12 having an arcuate flange 14 and at least one hole 16 for receiving a bolt or other fastener that attaches the bracket 12 to a portion of an automobile engine, such as an engine block. L-shaped ribs 18 strengthen the flange 14. As shown most clearly in FIG. 2, the flange includes a rear surface 14a, an arcuate or curved blade support surface 14b, a leading end 14c and a trailing end 14d (in use, the leading end 14c is the upstream edge insofar as chain movement in a direction 38 is concerned). The bracket is formed from any suitable material such as metal or a plastic material such as filled or unfilled plastic.

As shown in FIGS. 1 and 2A, a contoured keyhole aperture 20 is defined in the trailing end region 14d of the flange 14. As shown in FIGS. 1 and 2B, an outwardly opening notch 21 is formed in the leading end 14c of the flange.

A guide blade 22, preferably defined from a plastic material, is releasably mounted to the bracket adjacent the flange 14. With reference to FIG. 3, the blade 22 includes an outer face 22a, an inner face 22b, a leading end 22c and a trailing end 22d. As shown in FIG. 2, the blade 22, when operably connected to the bracket 12, closely conforms to the shape of the blade support surface 14b of the flange so that the inner face of the blade 22b lies adjacent the blade support surface 14b of the flange and so that the outer face 22a of the blade is exposed and adapted to slidably support a chain moving thereon.

The plastic blade 22 is releasably yet securely connected to the bracket 12. To accomplish this result, the blade 22, as shown in FIG. 3, includes a hook-shaped portion 24 at its leading end 22c that is adapted for closely slidably receiving the leading end portion 14c of the flange 14. A rib 25 spans or partially spans the internal space of the hook-shaped portion 24 and is adapted for close sliding receipt into the outwardly opening notch 21 defined in the flange 14 as shown in FIG. 2B.

A locking tab or nib 26 and a male connector 28, such as a T-shaped connector as shown herein, project outwardly from the inner face 22b of the blade 22 near the trailing end portion 22d, with the connector 28 positioned closer to the trailing end 22d of the blade 22 than the nib 26.

The male connector 28 includes an enlarged end 30 and a leg 32 that joins the enlarged end 30 to the blade 22. With reference to FIG. 2A, the keyhole aperture 20 includes an enlarged portion 34 at a leading end and a restricted or neck portion 36 at a trailing end of the aperture. The width $W_1$ of the enlarged portion is dimensioned so as to permit the enlarged end 30 of the male connector 28 to pass therethrough during mounting of the blade 22 to the bracket 12. The width $W_2$ of the restricted portion 36 of the keyhole 20 is dimensioned so as to closely accommodate the upstanding leg 32 of the male connector 28 but not the enlarged end 30. Thus, those of ordinary skill in the art will recognize that the trailing end 22d of the blade 22 is releasably connected to the bracket 12 by insertion of the enlarged end 30 through the enlarged portion 34 of the keyhole 20 and by thereafter sliding the blade 22 toward the trailing end 14d of the flange 14 (in the direction of chain movement as indicated by the arrow 38 in FIG. 2A) so that the leg 32 of the male connector is slidably received into the restricted portion 36 of the keyhole aperture and so that the enlarged end 30 of the male connector is trapped in the keyhole aperture 20 by the restricted portion 36 thereof as shown in FIG. 1.

To connect the blade 22 to the bracket 12, the male connector 28 is inserted through the enlarged portion 34 of the keyhole aperture and the inner surface 22b of the blade 22 is abutted with the blade guide support surface 14b of the flange. Thereafter, the blade 22 is moved slidably in the direction of chain movement (i.e., toward the trailing end 14d) as indicated by the arrow 38, so that the leg 32 of the male connector 28 enters the restricted portion 36 of the keyhole aperture 20 substantially simultaneously with the entrance of the rib 25 into the open notch 21 at the leading end 14c of the flange. To completely install the blade 22, the blade is slid as far as possible in the chain travel direction 38 so that the leading end 14c of the flange 14 is fully seated in the hook-shaped portion 24 of the blade 22 and so that the leg 32 of the male connector 28 is located in the restricted portion 36 of the keyhole aperture 20. When the blade 22 is slid to its fully installed position as described and as shown in FIGS. 1 and 2, the locking nib 26 of the blade moves into the keyhole aperture 20. Thus, although limited reverse sliding movement of the blade 22 in a direction opposite the chain travel direction is allowed, upon sufficient reverse sliding movement, the locking nib 26 engages the bracket structure that defines the aperture 20 and inhibits further reverse sliding movement of the blade 22.

Figure 4:
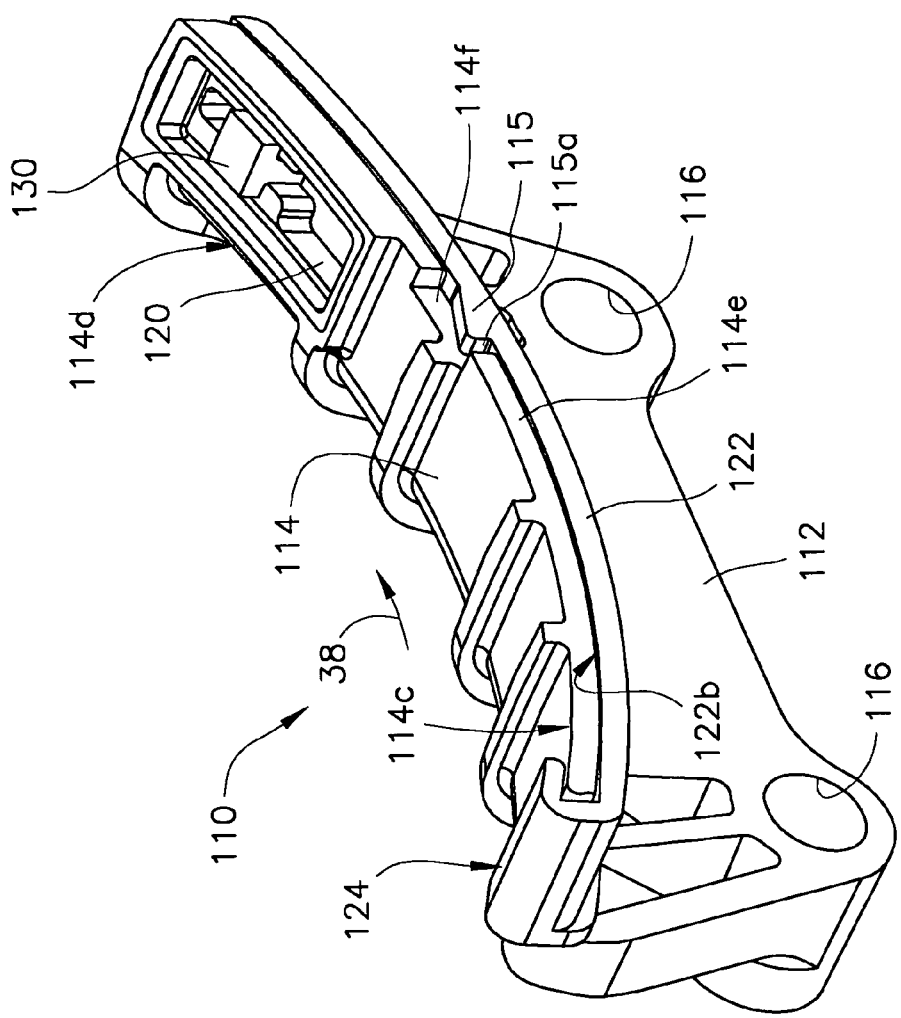
FIG. 4 is an isometric view of a second embodiment of a snap-fit chain guide formed in accordance with the present invention.

FIG. 4 illustrates a chain guide assembly 110 formed in accordance with an alternative embodiment of the present invention. Except as otherwise shown and described, the chain guide assembly 110 is identical to the chain guide assembly 10. Therefore, like components are identified with like reference numerals that are 100 greater than those used in FIGS. 1–3 and new components are identified with new reference numerals. In particular, the outermost edge 114e of the bracket flange 114 defines an open notch 114f located between the leading and trailing end portions 114c,114d. A tab 115 projects from the inner surface 122b of the blade 122 and is received into the notch 114f when the blade 122 is operably connected to the bracket 112. Preferably, the tab 115 is conformed as shown to have a wall 115a that is oriented perpendicular or otherwise sufficiently transverse to the inner surface 122b of the blade. Once the blade 122 is operably installed as shown, with the tab 115 received in the notch 114f, any attempted movement of the blade 122b in a direction opposite the chain travel direction (opposite the arrow 38) results in the transverse surface 115a abutting a portion of the flange 114 defining the notch 114f which, in turn, prevents further movement of the blade 122 in that direction. It should be noted that tab 115 and notch 114f can be used as an alternative or in addition to the locking nib 26 described above.

Figure 5A:
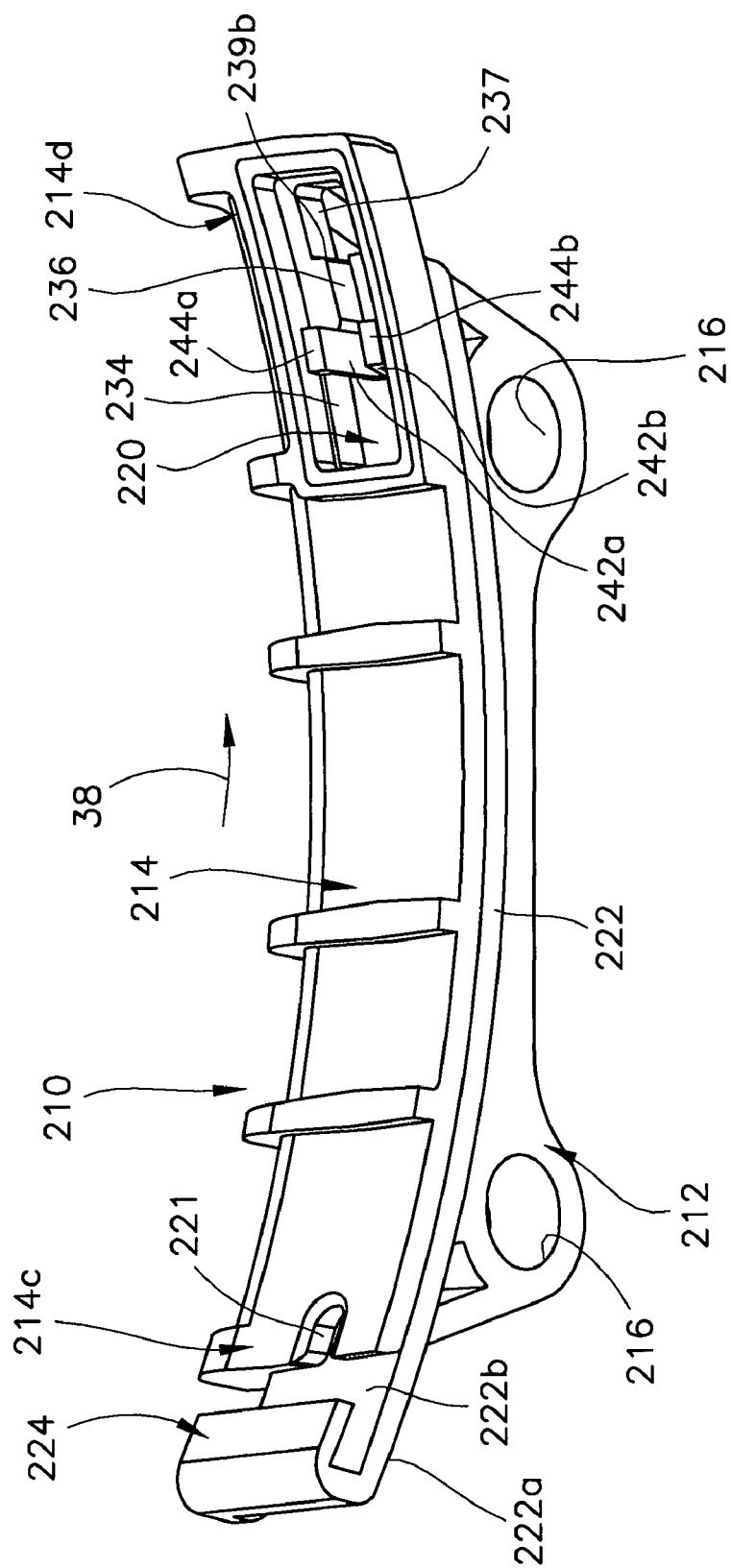
FIGS. 5A–5C are isometric views of a third embodiment of a snap-fit chain guide formed in accordance with the present invention and showing the plastic blade in a first, intermediate and final installation positions, respectively.
Figure 5B:
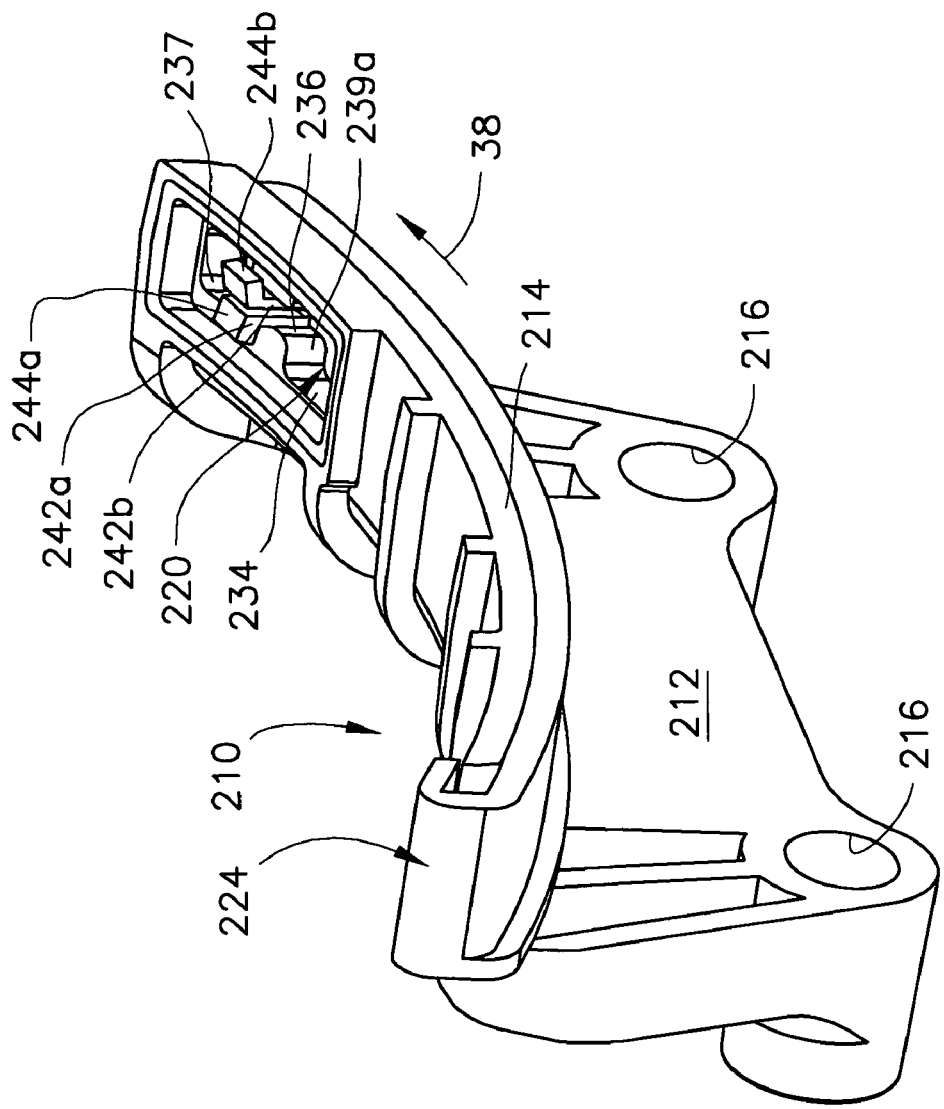
Figure 5C:
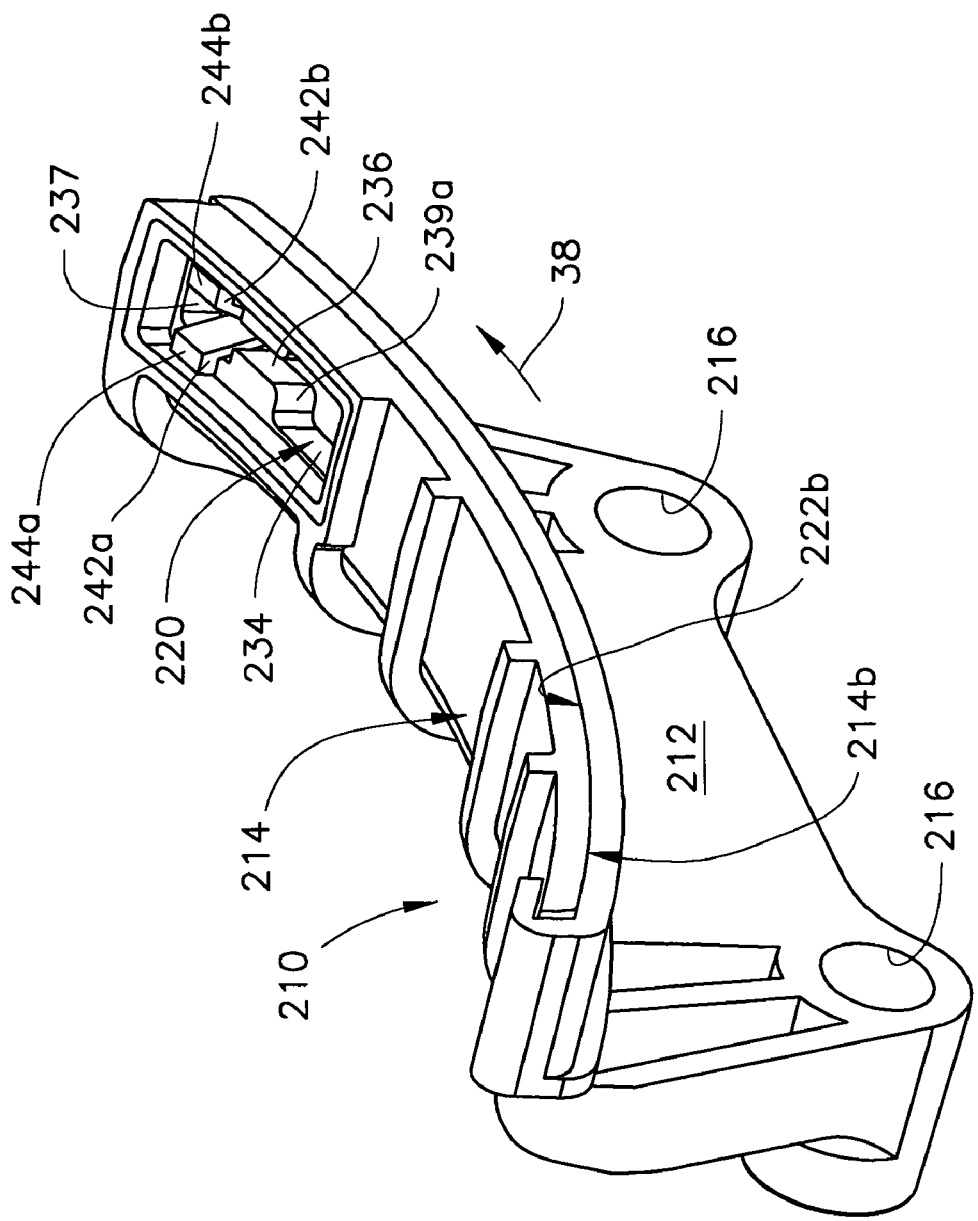

Another alternative embodiment of a chain guide assembly formed in accordance with the present invention is illustrated in FIGS. 5A–5C and identified generally at 210. Except as otherwise shown and described herein, the chain guide assembly is identical to the chain guide assembly 10. Accordingly, like components relative to the chain guide assembly 10 are identified with like reference numerals that are 200 greater than those used in FIGS. 1–3, and new components are identified with new reference numerals.

More particularly, the chain guide assembly 210 includes a blade 222 that replaces the male connector 28 with a V-shaped connector 240 comprising first and second resilient legs 242a,242b that project outwardly from the inner surface 222b of the blade 222. The legs 242a,242b are connected to the blade 222 adjacent each other and diverge as they extend upwardly away from the inner surface 222b of the blade 222. Preferably, the distal ends of the legs 242a,242b respective define transverse feet 244a,244b or are otherwise enlarged relative to the remainder of the leg.

To receive and engage the V-shaped connector, the trailing end region 214d of the bracket flange 214 defines a keyhole aperture 220 that is similar to the keyhole aperture 20 described above. However, the keyhole aperture 220 includes three different regions; an enlarged region 234 that receives the resilient legs 242a,242b when they are in a relaxed or free (spread-apart) condition (see FIG. 5A); a restricted neck portion 236 that is wide enough to accommodate the resilient legs 242a,242b only if they are moved adjacent each other (see FIG. 5B); and a third region 237 that is dimensioned to allow the legs 242a,242b to spread apart resiliently but that is sufficiently restricted so that, when the legs 242a,242b spread apart, the feet 244a,244b extend outwardly beyond the periphery of the region 237 and abut the flange 214 so that the inner surface 222b of the blade 222 is held in abutment with or closely adjacent the blade support surface 214b of the flange 214. Furthermore, when the legs 242a,242b spread in the region 237 of the keyhole aperture 220, they are prevented from moving back into the restricted portion 236 of the keyhole aperture 220, although the legs 242a,242b can move a limited amount within the third portion 237 of the aperture. Accordingly, blade 222 becomes engaged with the flange 214 as shown in FIG. 5C.

It is most preferred that, as shown most clearly in FIGS. 5B and 5C, a smoothly converging transition region or shoulder region 239a be defined between the enlarged region 234 and the restricted neck region 236 of the keyhole aperture 220 so that, after the V-shaped connector is received in the enlarged portion 234, sliding movement of same toward the restricted region 236 results in the legs 242a, 242b contacting this shoulder region 239a which, in turn, forces the legs 242a,242b toward each other so that they are slidably accommodated in the restricted neck portion 236 without undue effort and with simple sliding movement of the blade 222 in the chain travel direction 38. To prevent any undesired "play" or "slop" in blade 222 once it is fully and operably connected to the bracket 212 as shown in FIG. 5C, it is most preferred that the keyhole aperture 220 be dimensioned so that the legs 242a,242b, when operably held in the third region 237 of the keyhole aperture, be located as close as possible or in abutment with a second shoulder region 239b (FIG. 5A) defined where the restricted neck portion 236 opens into the third region 237. Further, it is most preferred that this shoulder region 239b be perpendicular or otherwise sufficiently transverse relative to the chain movement direction 38 as shown herein so that, in contrast to the shoulder 239a, it does not facilitate movement of the legs 242a,242b toward each other upon sliding movement of the blade 222 toward the restricted neck region 236.

Connection of the blade 222 to the bracket 212 is otherwise identical to the process described above for connecting the blade 22 to the bracket 12, except that the V-shaped connector defined by the legs 242a,242b engages the keyhole aperture 220 instead of the male connector 28 engaging the keyhole aperture 20.

Figure 6A:
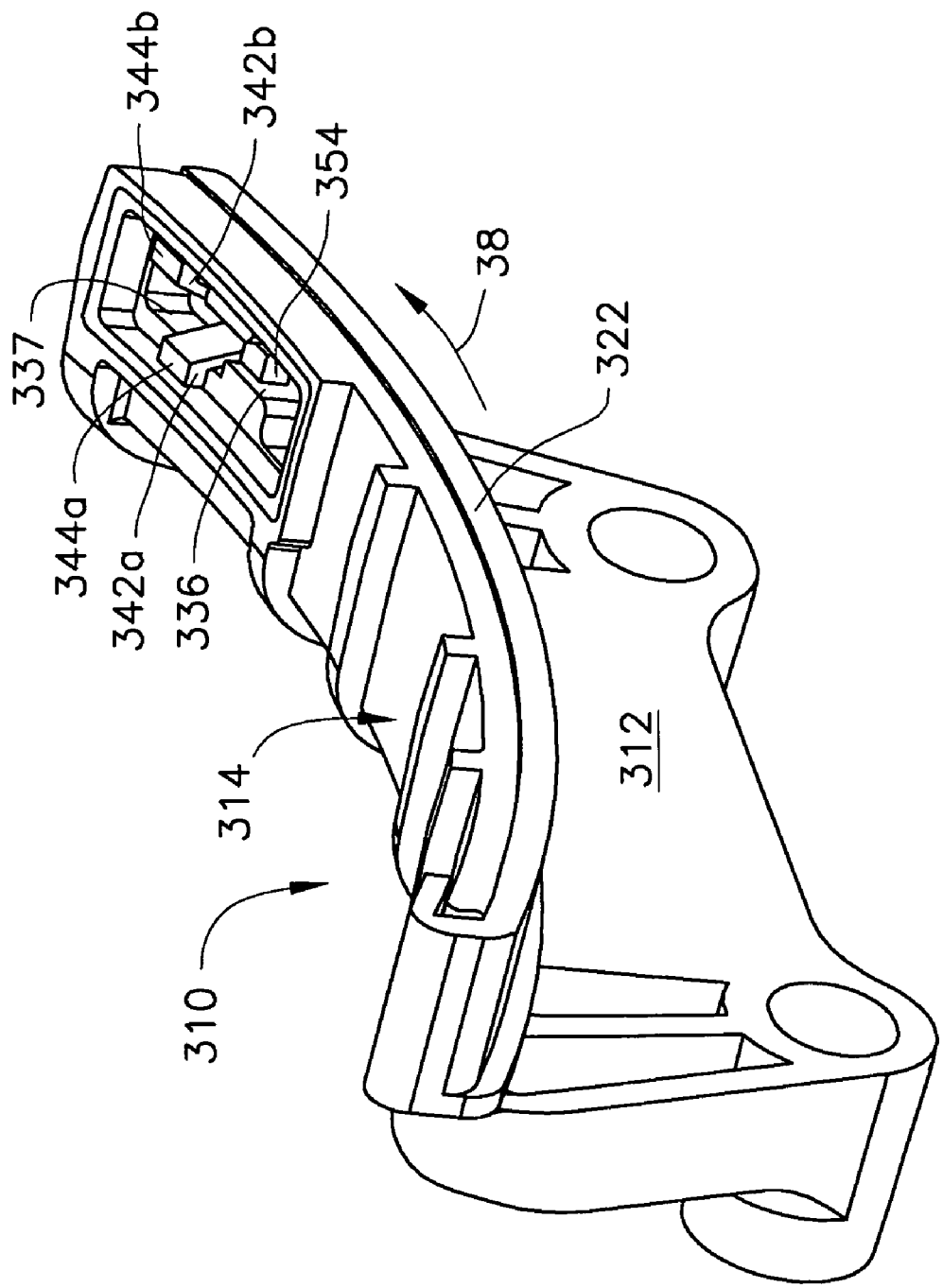
FIG. 6A is an isometric view of a snap-fit chain guide formed in accordance with a fourth embodiment of the present invention.
Figure 6B:
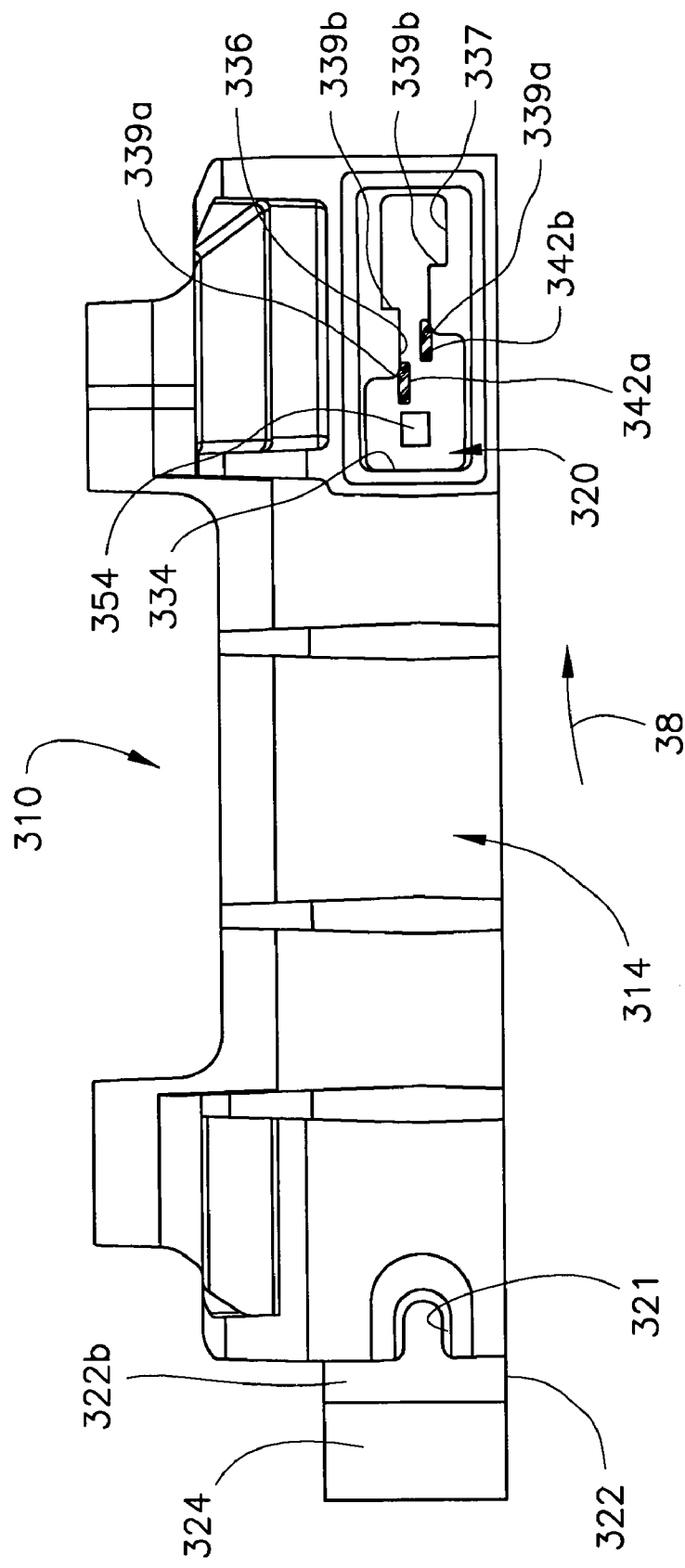
FIG. 6B is a plan view of the snap-fit chain guide shown in FIG. 6A, wherein the resilient legs of the plastic blade are shown in section for ease of illustrating their offset arrangement.

FIGS. 6A and 6B illustrate a chain guide assembly 310 formed in accordance with a fourth embodiment of the present invention. Except as otherwise shown and described, the chain guide 310 is identical to the chain guide 210. Therefore, like components are identified with like reference numerals that begin with a "3" rather than a "2." In particular, to facilitate molding of the plastic blade 322, the legs 342a,342b are offset from each other in the chain travel direction 38 as is shown most clearly in FIG. 6B. This requires that the keyhole aperture 320 be non-symmetrically defined as shown so that the legs 342a,342b contact the offset shoulders 339a substantially simultaneously as shown in FIG. 6B. Here, again, the shoulders 339a are rounded and conformed so that the legs 342a,342b, when positioned in the enlarged portion 334 of the keyhole aperture 320 and slid in the chain travel direction 38, are resiliently moved toward each other by the shoulders 339a. Of course, owing to the offset legs 342a,342b, the slot portion 337 is conformed so that the legs lie closely adjacent and engage respective offset transverse shoulders 339b when the blade is fully operably connected to the bracket 312 and when the legs 342a,342b spread apart upon being received in the third portion 337 of the keyhole aperture.

To further inhibit undesired movement of the blade 322 in a direction transverse to the chain travel direction 38, a block or other projection 354 is provided and projects outwardly from the inner surface 322b of the blade upstream (relative to the chain travel direction 38) from the legs 342a,342b. This block 354 is dimensioned to be closely received in the restricted neck portion 336 of the keyhole aperture 320. When so positioned, as shown in FIG. 6A, the block 354 and blade 322 are restrained against movement in a direction transverse to the chain travel direction. This feature is also contemplated for use in connection with the chain guide assembly 210.

Figure 7A:
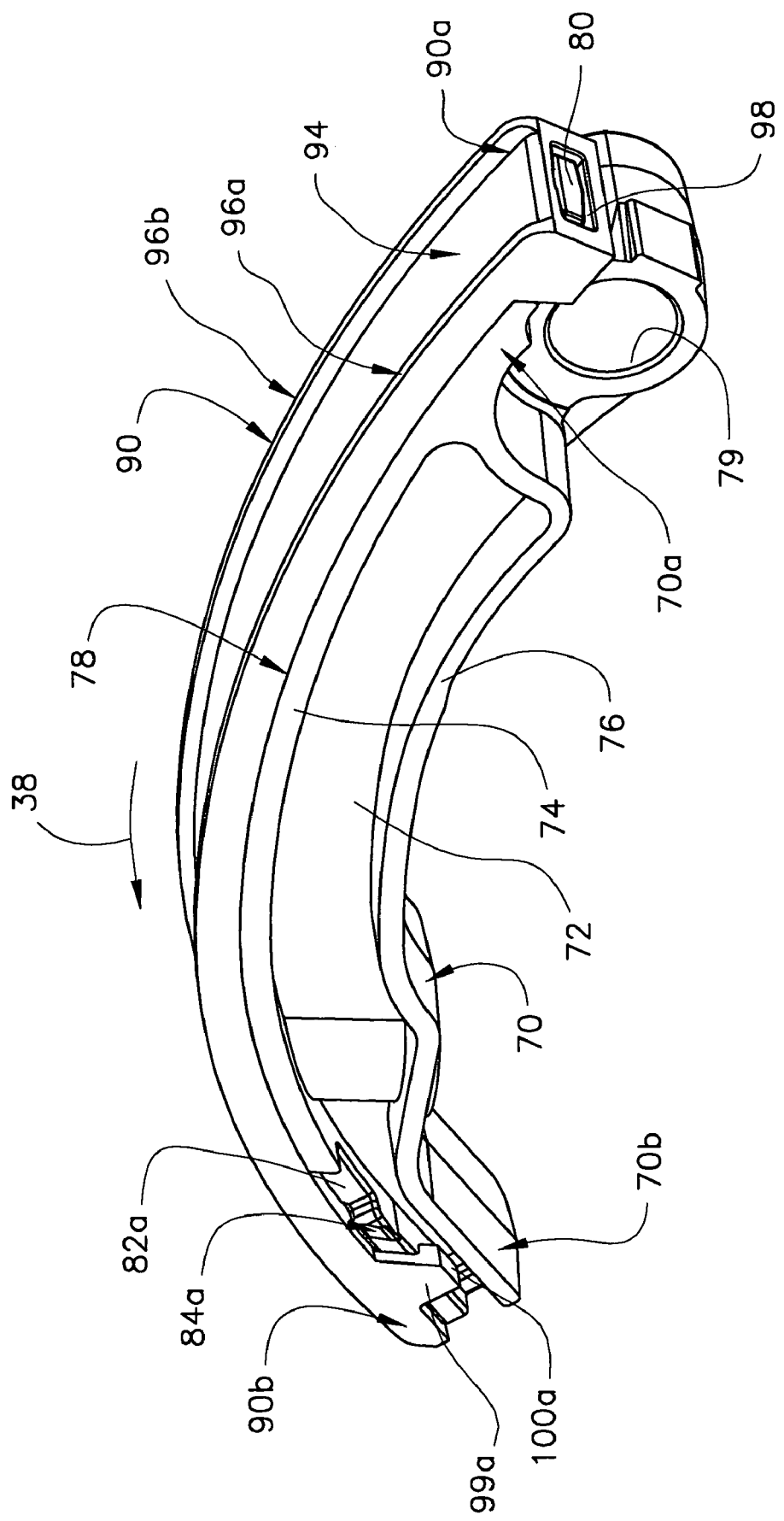
FIG. 7A is an isometric illustration of a fifth embodiment of a snap-fit chain guide formed in accordance with the present invention in the form of a chain tensioner arm.
Figure 7B:
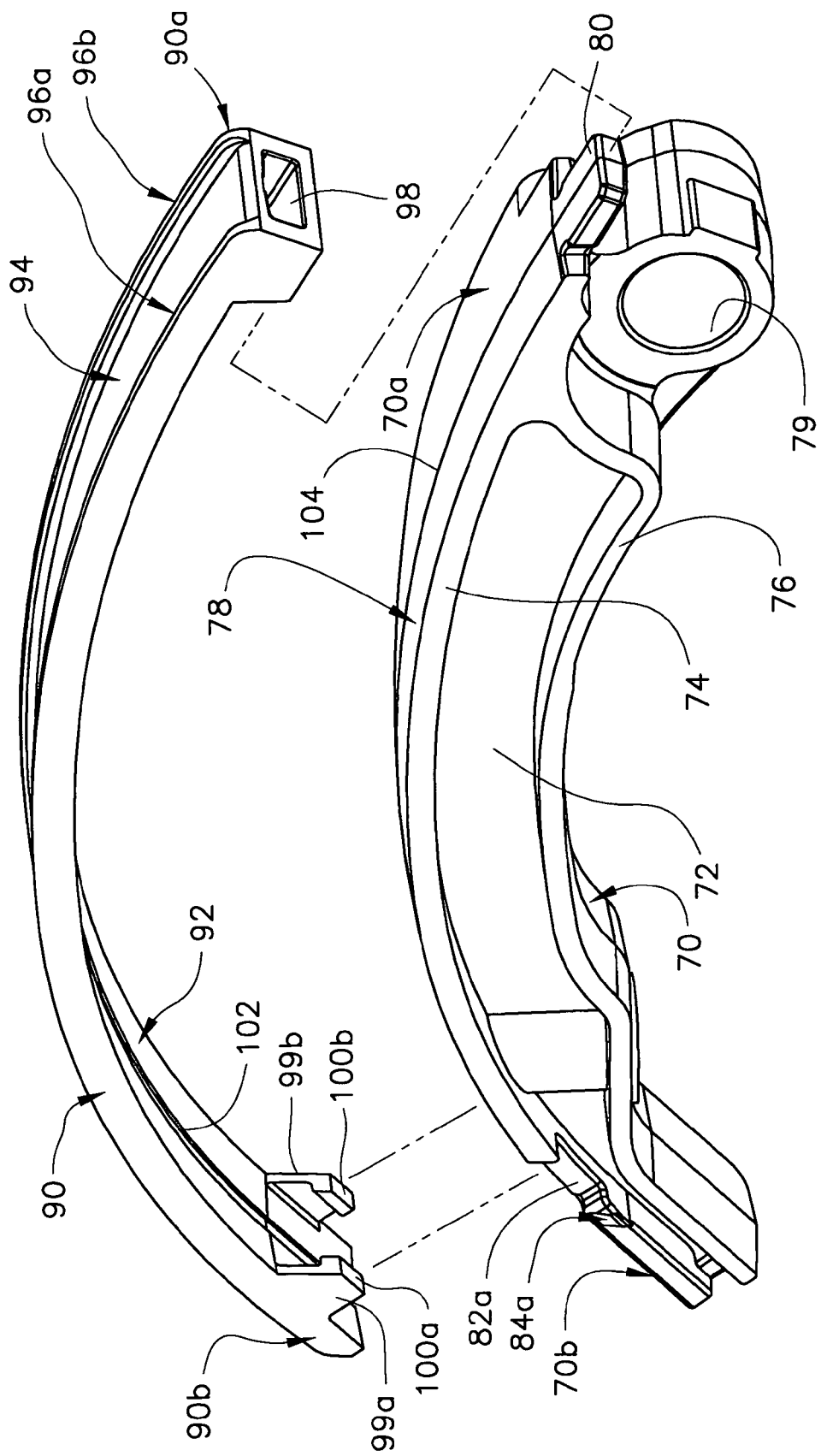
FIG. 7B is an exploded isometric illustration of the snap-fit chain guide shown in FIG. 7A.
Figure 8:
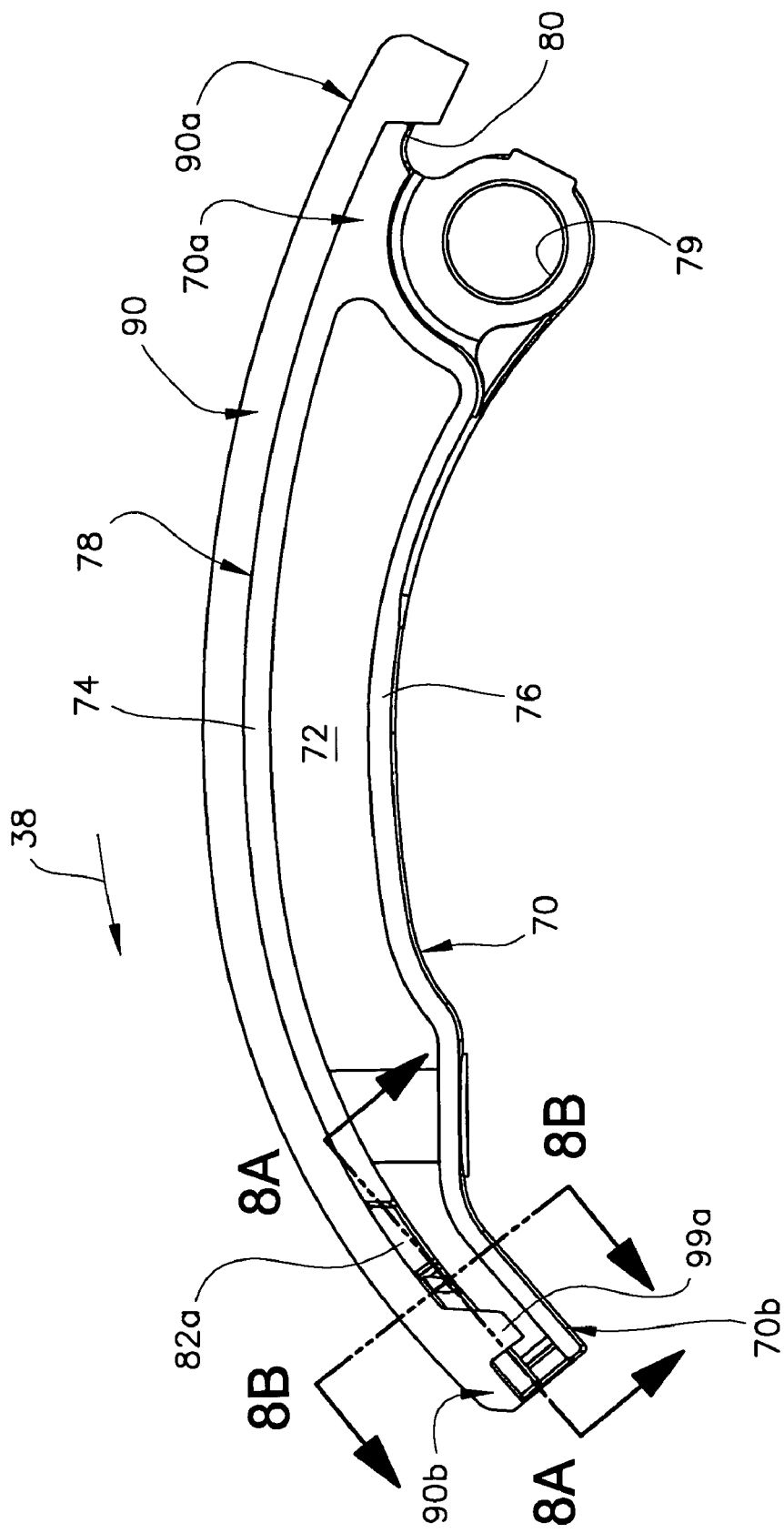
FIG. 8 is a front elevational view of the snap-fit chain guide shown in FIG. 7A.

FIGS. 7A–8 illustrate a tensioner arm chain guide incorporating an I-beam bracket construction. The I-beam structure is not conducive to formation of keyhole apertures and the like in the bracket. Accordingly, different structures must be employed to connect a blade to the bracket with a snap-fit arrangement.

In particular, as shown in FIGS. 7A–8, an I-beam bracket 70 comprises a central web 72 and upper and lower transverse flanges 74,76 connected to opposite ends of the web 72. The upper flange 74 defines an outwardly facing curved blade support surface 78. The bracket 70 further defines an aperture 79 that facilitates pivotable securement of the bracket to an associated engine block or other structure. The bracket includes a leading end 70a and a trailing end 70b. In operation, the leading end 70a is located upstream relative to the trailing end 70b with respect to movement of an associated chain in a direction indicated by the arrow 38.

The leading end 70a of the bracket includes or defines a projecting tongue 80. The upper flange 74 of the bracket 70, in the region of the trailing end 70b, defines first and second notches 82a,82b on opposite front and rear edges 74a,74b thereof (see also FIGS. 8A-1–8A-3). As is also shown most clearly in FIGS. 8A-1–8A-3, the bracket 70 includes first and second locking ramps 84a,84b that project outwardly from the front and rear faces 74a,74b. These ramps 84a,84b are defined with inclined surface 86a,86b that diverge moving toward the trailing end 70b of the bracket. The ramps 84a,84b also define respective transverse shoulders 88a,88b. As described in detail below, these structures of the bracket are engaged with mating structures of a plastic blade 90 to releasably and securely affix the blade 90 to the bracket 70.

The blade 90, itself, includes a leading end 90a and a trailing end 90b, with the leading end 90a being upstream relative to the trailing end 90b insofar as chain movement in a direction 38 is concerned. An inner surface 92 of the blade 90 is conformed and dimensioned for abutting the blade support surface 78 of the bracket 70. Opposite the inner surface 92, the blade defines a chain guide surface 94 adapted for slidably abutting an associated chain. In the illustrated embodiment, the chain guide surface 94 is bounded by front and rear lips 96a,96b.

The leading end 90a of the blade 90 defines or includes a structure for releasably and slidably engaging the tongue 80 of the bracket 70. In the illustrated embodiment, the leading end 90a of the blade defines a slot 98 that closely and slidably receives and retains the tongue 80. The trailing end 90b of the blade includes or defines first and second legs 99a,99b that project outwardly therefrom on opposite front and rear sides of the blade 90. The distal ends of the legs 99a,99b respectively include feet 100a, 100b that are turned inwardly toward each other.

Figures 1, 8A:
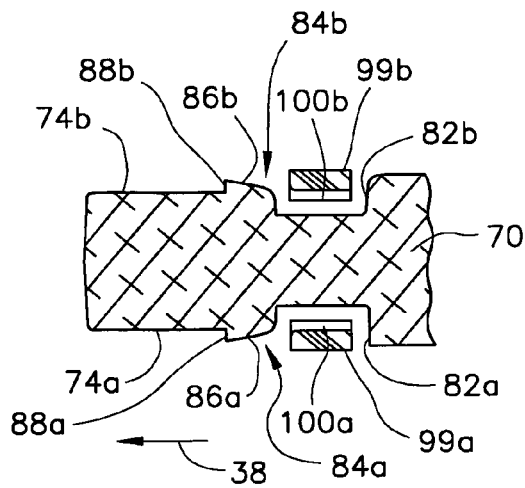
Figures 1, 8B:
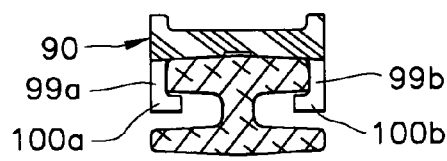
Figures 2, 8A:
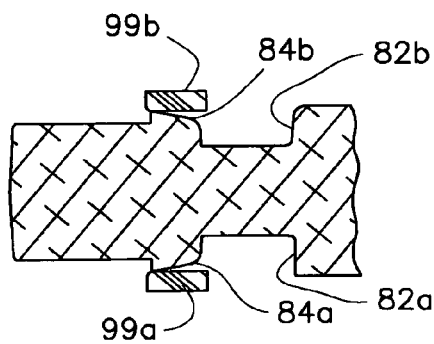
Figures 2, 8B:
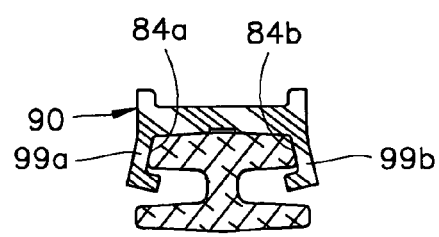
Figures 3, 8A:
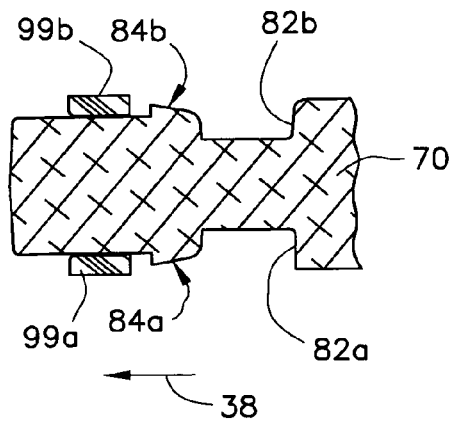
Figures 3, 8B:
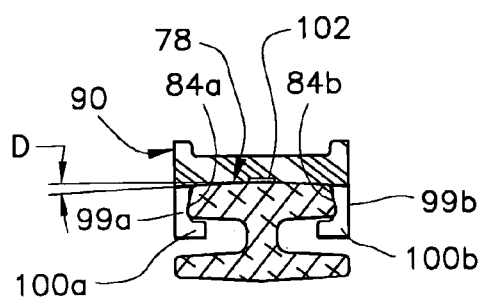

To connect the blade 90 to the bracket 70, the legs 99a,99b are placed in the notches 82a,82b, respectively and the inner surface 92 of the blade is abutted with the blade support surface 78 of the bracket 70. FIGS. 8A-1 and 8B-1 show the positions of the legs 99a,99b in this initial position. Thereafter, the blade 90 is slidably moved toward the trailing end 70b of the bracket 70 (i.e., in the chain movement direction 38) so that the tongue 80 is slidably received in the slot 98 located at the leading end 90a of the blade and to that the legs 99a,99b resiliently engage the ramps 84a,84b, respectively. FIGS. 8A-2 and 8B-2 show the legs 99a,99b in the position wherein they are resiliently deflected away from each other as they pass over the ramps 84a,84b. Continued sliding of the blade 90 toward the trailing end 70b of the bracket results in the tongue 80 being fully received in the slot 98 and results in the legs 99a,99b passing over the ramps 84a,84b and being trapped behind and located adjacent the transverse shoulders 88a,88b so that the blade 90 is fully operably positioned on and releasably connected to the bracket 70. This position, where the blade 90 is operably connected to the bracket 70, is shown in FIGS. 8A-3 and 8B-3.

Those of ordinary skill in the art will recognize that the ramps 84a,84b are conformed and dimensioned so that the legs are able to slidably move over the ramps when the blade 90 is moved in the chain movement direction 38, but the ramps (in particular the shoulders 88a,88b) prevent the legs 99a,99b and consequently the entire blade 90, from moving in the opposite direction after the blade is fully operably installed on the bracket 70 as just described. Furthermore, once the blade 90 is operably connected to the bracket 70 as shown in FIGS. 7A, 8, 8A-3 and 8B-3, the trailing end 90b of the blade 90 is held closely adjacent the bracket owing to the fact that the feet 100a,100b of the legs 99a,99b are hooked around the upper transverse flange 74 with minimal clearance between the feet 100a,100b and the flange 74. Of course, the legs 99a,99b, themselves, lie closely adjacent the opposite edges 74a,74b of the bracket 70 and prevent movement of the blade 90 relative to the bracket 70 in any direction that is transverse to the chain movement direction 38. The close sliding receipt of the tongue 80 in the slot 98 secures the leading end 90a of the blade 90 to the leading end 70a of the bracket 70 so that the blade 90 is movable only slidably in a direction opposite the chain travel direction 38 and, as noted above, this is inhibited by the engagement of the legs 99a,99b with the shoulder 88a,88b, respectively. Thus, the blade 90 is fixedly yet releasably secured to the bracket 70 as required for operation.

With reference now to FIGS. 7B and 8B-3, the blade 90 is molded or otherwise formed to include a central groove 102 defined in the inner surface 92 and extending entirely between and through the leading and trailing ends 90a,90b of the blade. The groove is positioned and dimensioned to accommodate any flash or mis-match that may exist on the blade support surface 78 of the bracket at the diecast parting line 104 (FIG. 7B). Alternatively, the bracket can be defined to include a rib located along the parting line 104 that is received in the groove 102 of the blade.

As shown in FIG. 8B-3, the blade support surface 78 of the bracket 70 is conformed with a draft angle D between the diecast parting line 104 (FIG. 7B) and each opposite face 74a,74b. The inner surface 92 of the blade is conformed with mating reverse draft that closely mates with the blade support surface 78 of the bracket. This relationship between the inner surface 92 of the blade and the blade support surface 78 of the bracket provides further stability to the blade 90 in directions transverse to the chain travel direction 38.

The invention has been described with reference to preferred embodiments. Modifications and alterations may occur to those of ordinary skill in the art upon reading this specification. It is intended that the invention be construed as including all such alterations and modifications insofar as they fall within the scope of the appended claims as construed literally and/or according to the doctrine of equivalents.

Having thus described the preferred embodiments, what is claimed is:

1. A chain guide comprising:
   an I-beam bracket adapted for being secured to an associated engine, said I-beam bracket comprising a web, upper and lower flanges connected to said web, a support surface defined by said upper flange, a leading end and a trailing end spaced from said leading end in a chain movement direction; and,
   a guide blade comprising a blade leading end, a blade trailing end spaced from said blade leading end in said chain movement direction, a chain guide surface adapted for slidably supporting an associated chain moving in said chain movement direction, and an inner surface positioned on said support surface of said bracket, said guide blade selectively movable slidably on said support surface and while in contact with said support surface in said chain movement direction and a direction opposite said chain movement direction between a first position where said guide blade is separable from said bracket and a second position where said guide blade is fixedly secured to said bracket, wherein:
   said blade leading end defines a space that receives said bracket leading end when said blade is positioned in said second position;
   said guide blade comprises first and second legs projecting therefrom on opposite sides of said chain guide surface, and wherein said upper flange of said bracket defines said support surface between opposite front and rear edges, said front and rear edges of said upper flange defining respective first and second locations positioned to receive said first and second legs, respectively, when said guide blade is located in said first position, said legs defining respective first and second feet that hook around said upper flange when said guide blade is moved slidably to said second position so that said inner surface of said guide blade is held adjacent said support surface of said bracket by said legs;

wherein said front and rear edges of said upper flange define respective ramps over which said first and second legs respectively and resiliently move when said guide blade moves from said first position to said second position, said first ramp comprising a first transverse shoulder and said second ramp comprising a second transverse shoulder, wherein said first and second transverse shoulders engage said first and second legs, respectively, to inhibit reverse movement of said guide blade from said second position to said first position.

2. The chain guide as set forth in claim 1, wherein said guide blade comprises a plastic material.

3. The chain guide as set forth in claim 1, wherein said bracket leading end comprises a tongue projecting outwardly therefrom that is received in said space defined by said guide blade leading end when said guide blade is located in said second position.

4. The chain guide as set forth in claim 3, wherein said guide blade leading end engages said tongue and restrains said guide blade against movement except in a direction opposite said chain travel direction.

5. The chain guide as set forth in claim 1, wherein said guide blade defines first and second lips that project outwardly above said chain guide surface on opposite front and rear edges of said chain guide surface.

6. The chain guide as set forth in claim 1, wherein said support surface of said bracket is defined with a draft angle and said inner surface of said guide blade is defined with a reverse draft angle whereby said support surface and said inner surface are non-planar and mate with each other to inhibit movement of said guide blade in a direction transverse to said chain travel direction.

7. A chain guide comprising:

a bracket adapted for being secured to an associated engine, said bracket comprising a support surface, a bracket leading end, a bracket trailing end spaced from said leading end in a chain movement direction, and front and rear edges on opposite sides of said support surface;

a guide blade comprising a blade leading end, a blade trailing end spaced from said blade leading end in said chain movement direction, a chain guide surface adapted for slidably supporting an associated chain moving in said chain movement direction, and an inner surface positioned adjacent said support surface of said bracket, said guide blade selectively movable slidably on said support surface and while in contact with said support surface in said chain movement direction and in a direction opposite said chain movement direction between a first position where said guide blade is separable from said bracket and a second position where said guide blade is fixedly secured to said bracket, said guide blade comprising: (i) a connector portion at said blade leading end that receives a portion of said bracket when said guide blade is positioned in said second position; and, (ii) first and second legs projecting from said guide blade on opposite sides of said chain guide surface, said first and second legs defining respective first and second feet that respectively hook around said front and rear edges of said bracket when said guide blade is moved slidably from said first position to said second position, wherein said front and rear edges of said bracket respectively define first and second ramps over which said first and second legs respectively and resiliently move when said guide blade moves from said first position to said second position, said first ramp comprising a first transverse shoulder and said second ramp comprising a second transverse shoulder, wherein said first and second transverse shoulders engage said first and second legs, respectively, to inhibit reverse sliding movement of said guide blade from said second position to said first position.

* * * * *